UNITED STATES PATENT OFFICE.

J. TYLER RYAN, OF HAMILTON, OHIO, ASSIGNOR OF ONE-HALF TO LOUIS SNIDER'S SONS, OF SAME PLACE.

ART OF MAKING PAPER OF IMPERFECTIONS.

SPECIFICATION forming part of Letters Patent No. 281,400, dated July 17, 1883.

Application filed April 27, 1883. (No specimens.)

*To all whom it may concern:*

Be it known that I, J. TYLER RYAN, of Hamilton, Butler county, Ohio, have invented certain new and useful Improvements in the Art of Making Paper of Imperfections, of which the following is a specification.

Scrap-paper, be it newspaper, letter-paper, or book-paper, when used as a stock from which to make paper, is by the paper-maker termed "imperfections."

Previous to my invention it has been the custom to admit not over fifty per cent. of imperfections into the stock for new paper, the balance of the stock being made up of rags or other expensive material. The ink on the imperfections has not, previous to my invention, been so thoroughly removed as to permit a pure white or other light-colored paper to be made if more than fifty per cent. of imperfections was used in the stock. Rarely has more than twenty-five per cent. of imperfections been used, and even then the paper was faulty on account of ink remaining in the stock and paper.

The object of my invention is to so treat the imperfections that a first-class clean paper may be made of imperfections entirely.

In order that my improvement may be understood and practiced, I will first describe the old and faulty method of treating imperfections. I will then describe my improved method, and finally point out and indicate apparatus by which my process may be executed.

By the old process the imperfections, consisting of old letters, documents, newspapers, books, &c., were dusted, and then put into a rotary boiler, and cooked and pulped in an alkali solution. This operation produced a mass partly pulped and so conglomerated that the alkali could not reach all of the ink. Much of the ink thus remained to form a constituent part of the pulp and paper made from it. This mass was then put into a washer, and the alkali and dissolved ink removed, after which it was beaten to the proper pulp and mixed with the other portions of the stock, such as rag-stock, &c.

In the execution of my process I first pass the imperfections through a duster, all thick old books being previously torn apart to reduce them to a few leaves. I then treat the imperfections to the action of hot alkali without pulping the imperfections. The alkali solution thus acts on the surfaces of the imperfections and dissolves off and carries away all the ink into the solution. I then drain the imperfections, which are still in sheet form, as free as convenient from the alkali solution. I then place the imperfections, still in sheet form, in the washing-engine, and wash out the alkali solution, which leaves the imperfections perfectly clean. It is then pulped in the beating-engine, and formed into first-class clean paper without the addition of any new or expensive paper-stock.

In executing my process use a common duster. Into a bucking-keir put a soda-ash solution having a density of 5° Baumé at 160° Fahrenheit. Put in the stock, and shower for eight hours at a temperature of 160° Fahrenheit, without pulping the imperfections; then lift, and drain and cleanse well in the washing-engine; then pulp and form into paper.

As the draining operation will always be imperfect, each charge removed will carry away some of the soda-ash solution and leave the remainder of impaired strength. After each drainage, add water to make up for loss in quantity of solution, and add enough soda-ash solution having a density of 13° Baumé to bring all the solution up to 5° Baumé at 160° Fahrenheit. In about eighteen working days the liquor will have accumulated considerable ink and other matter. Then blow half the liquor, and restore the quantity for proper working. None of the soda-ash solution is wasted, except such as fails to drain, and such as is blown out, as last mentioned.

To boil scrap-paper in alkali, then cool it, then boil in new solution, then beat to pulp in alkali, then wash, &c., is an old process, and I disclaim it.

In my process every care is to be taken to guard against pulping before alkali is washed out.

I claim as my invention—

The improvement in the art of making paper of imperfections, which consists in dusting the imperfections, then placing the imperfections in a hot alkali solution and dissolving the surface ink, then draining the imperfections while still in sheet form, then washing from the surfaces of the imperfections the alkali and dissolved ink, then pulping the imperfections, and finally forming the pulp into paper.

J. TYLER RYAN.

Witnesses:
 J. W. SEE,
 ISRAEL WILLIAMS.